United States Patent
Hasnaoui et al.

(10) Patent No.: US 11,186,153 B2
(45) Date of Patent: Nov. 30, 2021

(54) WINDOWS SEALING STRIP WITH EASE OF MOUNTING

(71) Applicant: PSA AUTOMOBILES SA, Poissy (FR)

(72) Inventors: Farid Hasnaoui, Trevenans (FR); Amar Hasnaou, Chatenois-les-forges (FR)

(73) Assignee: PSA AUTOMOBILES SA, Poissy (FR)

( * ) Notice: Subject to any disclaimer, the term of this patent is extended or adjusted under 35 U.S.C. 154(b) by 57 days.

(21) Appl. No.: 16/642,305

(22) PCT Filed: Aug. 2, 2018

(86) PCT No.: PCT/FR2018/051998
§ 371 (c)(1),
(2) Date: Feb. 26, 2020

(87) PCT Pub. No.: WO2019/053347
PCT Pub. Date: Mar. 21, 2019

(65) Prior Publication Data
US 2021/0070157 A1   Mar. 11, 2021

(30) Foreign Application Priority Data
Sep. 15, 2017 (FR) ........................................ 1758593

(51) Int. Cl.
*B60J 1/16* (2006.01)
*B60J 10/75* (2016.01)

(52) U.S. Cl.
CPC .................... *B60J 10/75* (2016.02)

(58) Field of Classification Search
CPC ................................. B60J 10/75; B60J 10/33
(Continued)

(56) References Cited

U.S. PATENT DOCUMENTS 2,942,309 A    6/1960   Renaudin
4,696,128 A *   9/1987   Fukuhara ............... B60J 10/265
                                                                            24/297

(Continued)

FOREIGN PATENT DOCUMENTS

EP     1755911 B1    4/2005
FR     1161142 A     9/1956
(Continued)

OTHER PUBLICATIONS

International Search Report for PCT/FR2018/051998 dated Nov. 14, 2018.
Written Opinion for PCT/FR2018/051998 dated Nov. 14, 2018.

*Primary Examiner* — Jerry E Redman
(74) *Attorney, Agent, or Firm* — Sandberg Phoenix & von Gontard, P.C.

(57) ABSTRACT

Sealing strip (9) intended to be mounted on an upper edge (3A) of an exterior panel (3) of the door provided with a window (5), comprising: a body (11) forming a slot (13) with two opposing faces (15, 17) able to fit over the upper edge (3A); a lip (19) extending along the body (11), intended to contact the window (5); and wherein at least one of the two opposing faces (15, 17) of the slot (13) comprises edge corners (25) running transversely to the strip (9) and each having an end face (25A) external to the slot (13), having a profile that makes a mean angle (α, β) comprised between 10° and 30° with a main direction of said slot (13) so as to encourage insertion of the edge (3A) in the slot (13).

11 Claims, 3 Drawing Sheets

(58) Field of Classification Search
USPC .................................................. 49/374, 377
See application file for complete search history.

(56) References Cited

U.S. PATENT DOCUMENTS

| | | | |
|---|---|---|---|
| 4,894,968 A | 1/1990 | Vaughan | |
| 5,085,005 A * | 2/1992 | Yasukawa | B60J 10/244 |
| | | | 15/250.1 |
| 5,353,549 A * | 10/1994 | Henderson | B60J 10/265 |
| | | | 49/377 |
| 5,363,537 A * | 11/1994 | Schneider | B60J 10/265 |
| | | | 24/289 |
| 5,740,640 A * | 4/1998 | Yasuda | B60J 10/265 |
| | | | 296/146.16 |
| 5,741,573 A | 4/1998 | Malm | |
| 5,799,442 A * | 9/1998 | Takahashi | B60J 10/75 |
| | | | 49/377 |
| 5,899,022 A * | 5/1999 | Gaw, Jr. | B60J 10/75 |
| | | | 49/377 |
| 6,128,859 A * | 10/2000 | Vance | B60J 10/265 |
| | | | 49/377 |
| 6,321,490 B1 * | 11/2001 | Vance | B29C 65/56 |
| | | | 49/377 |
| 6,742,304 B1 * | 6/2004 | Mueller | B60J 10/265 |
| | | | 49/377 |
| 8,789,313 B2 * | 7/2014 | Roll | B60J 10/75 |
| | | | 49/377 |
| 9,169,688 B2 * | 10/2015 | Wende | B60J 10/75 |
| 10,946,735 B2 * | 3/2021 | Robinson | B60J 10/75 |
| 2001/0025454 A1 * | 10/2001 | Cretin | B60J 10/265 |
| | | | 49/441 |
| 2004/0200151 A1 * | 10/2004 | Tognetti | B60J 10/75 |
| | | | 49/377 |
| 2013/0277516 A1 * | 10/2013 | Patterson | B60J 10/36 |
| | | | 248/231.81 |
| 2013/0305611 A1 | 11/2013 | Wende | |
| 2017/0015284 A1 * | 1/2017 | Phillip | B60J 10/75 |

FOREIGN PATENT DOCUMENTS

| | | |
|---|---|---|
| FR | 2943280 A1 | 3/2009 |
| FR | 2959700 A1 | 11/2011 |

\* cited by examiner

WINDOWS SEALING STRIP WITH EASE OF MOUNTING

CROSS-REFERENCE TO RELATED APPLICATIONS

This application is the US National Stage under 35 USC § 371 of International Application No. PCT/FR2018/051998, filed 2 Aug. 2018 which claims priority to French Application No. 1758593 filed 15 Sep. 2017, both of which are incorporated herein by reference.

BACKGROUND

The invention relates to the field of motor vehicles, more particularly to the exterior sealing strips of motor vehicle doors.

An exterior sealing strip is intended to be mounted on an exterior panel of a motor vehicle door. This strip comprises a slot fitting over an upper edge of the exterior panel of the door, and a lip resting on the window of the door, the lip limiting the penetration of water and dust into the door.

European Pat. No. 1755911B1 discloses an exterior sealing strip comprising a U-shaped body mounted on an exterior panel of a motor vehicle door. This strip comprises a slot fitting over the upper edge of the exterior panel of the door. One of the two opposing faces of this slot has inclined longitudinal slats to hook onto the upper edge of the door panel. The creation of these slats can, however, present difficulties and therefore additional production costs, particularly if they are made of a material other than that of the body forming the face on which they are provided. Moreover, the grip and hold achieved by these slats can prove insufficient.

Published French App. No. 2943280A1 discloses an exterior sealing strip positioned along the upper edge of a door panel of a motor vehicle. The upper edge has the particularity of being folded at 180° around a stiffening edge arranged on the interior face of the panel, the stiffener comprising regularly spaced openings. These openings make it easier to hook on the fixing lugs located on the internal faces of the strip body, thus improving the seal of the strip along the upper edge. This fixing system is advantageous in that the fixing is good; however, the fitting of the strip requires particular care in order to engage each of the lugs in the openings. Moreover, the fact that the upper edge of the door panel is folded around that of the stiffener has the advantage of presenting a rounded and non-projecting surface for the interior of the slot fitted onto the edge. The creation of such a fold, however, requires additional steps generating an extra cost.

SUMMARY

The object of the invention is to overcome at least one of the drawbacks of the above-mentioned state of the art. More particularly, the object of the invention is to propose a mounting of a window sealing strip on an exterior panel of a door that is robust, economical and easy to install, particularly along the edges of potentially projecting door panels.

The subject sealing strip is intended to be mounted on an upper edge of an exterior panel of a door provided with a window, the strip comprising: a body forming a slot with two opposing faces, able to fit over the upper edge of the door panel; a lip extending along the body, intended to contact the window; wherein at least one of the two opposing faces of the slot comprises ridges running transversely to the strip and each ridge having an end face external to the slot, having a profile that makes a mean angle ($\alpha$, $\beta$) of between 10° and 30° with a main direction of the slot so as to facilitate insertion of the edge in the slot.

Advantageously, a stiffener can be positioned on the rear face of the exterior panel, at the upper edge.

Advantageously, the ridges extend perpendicular to the strip.

According to an advantageous embodiment, the ridges each have a semi-circular cross section and are distributed evenly along the strip. The ridges are advantageously fluted.

According to an advantageous embodiment, one of the two opposing faces of the slot is an internal face located on the side of the lip, the face also comprising at least one boss having a triangular section extending longitudinally so as to form an inclined sliding face along the upper edge, the boss forming a clip able to engage in a corresponding orifice in the upper edge.

According to an advantageous embodiment, the or each boss also comprises a face engaging in the corresponding orifice of the upper edge, and two end faces, the inclined sliding face forming with the end faces two edges, at least one of the edges having a chamfer of at least 2 mm×2 mm. These two values are the distances in millimeters between each of the new ridges created by the chamfer and the theoretical ridge that the latter suppresses. Advantageously, the edge or edges that have the chamfer are those located on the same side corresponding to the edges that come into contact with the upper edge when gradually fitting the strip onto the door panel by bending.

According to an advantageous embodiment, the or each boss comprises, on the inclined sliding face, a metal piece able to reduce the grip of the boss on the upper edge when fitting the strip onto the upper edge of the door panel.

Advantageously, the metal piece is an insert fitted when molding the strip, or a fastener fixed to the boss after molding. The fastener is preferably fixed onto the strip from a lower end of the clip.

According to an advantageous embodiment, the portion of the body forming the interior face of the slot is a wall with transverse cutouts on either side of each boss so as to enable the wall to bend at the face between the cutouts when fitting the strip onto the upper edge. The cutouts extend through the wall of the strip, that is to say they pass through the entire thickness of the wall.

Advantageously, the clips are arranged solely at the ends of the strip, for example on the end portions of the corresponding strip, each at one quarter of the length of the strip.

According to an advantageous embodiment, the cutouts extend from one exterior edge of the interior face towards the bottom of the slot to a distance from the bottom of between 0 mm and 10 mm. This distance is advantageously between 0 mm and 5 mm.

According to another advantageous embodiment, the wall forming the interior face of the slot has at least one opening between two cutouts on either side of the or at least one bosses.

According to an advantageous embodiment, the opening or openings extend longitudinally in alignment with the bottoms of the cutouts. Alignment between the openings and bottoms of the cutouts means that the openings have a longitudinal axis that is aligned with the bottoms of the directly adjacent cutouts.

Advantageously, the wall forming the interior face of the slot has a reduced height at the level of the clip or clips. The reduced height of the wall may be less than 80% or greater than 50% of the maximum height of the wall.

Advantageously, the strip comprises at least one closing surface of the slot at one end of the strip intended to serve as an end stop for positioning the strip when fitting.

Also disclosed is a motor vehicle comprising at least one door, the door comprising: a movable window; an exterior panel; and the sealing strip described above with the window mounted on an upper edge of the exterior panel.

Advantageously, the portion of the body of the sealing strip forming the exterior face of the strip comprises an upper end and a lower end. From the lower end extend two lower lips and one exterior molding, the two lower lips being in contact with the exterior panel of the door. By contrast, the exterior molding forms in its upper part a hook positioned between the lip and the upper end of the body portion. This exterior molding is preferably made of a different material to the material of the strip, such as chrome. Advantageously, the strip is made of thermoplastic materials.

Advantageously, the strip is fitted onto the upper edge in accordance with the following steps: orientation of the strip at around 30° in relation to the upper edge of the exterior panel of the door, the closing surface of the strip being positioned in abutment against a respective end stop of the panel, then unrolling the strip onto the upper edge of the panel.

The sealing strip is advantageous in that it is easier to fit onto the exterior panel of the vehicle door. The sealing strip also has greater flexibility, and thus the speed of fitting the strip to the door panel is to be increased. The strip also has an exterior molding positioned at the front of the strip that will improve its aesthetic appearance. The cutouts make it possible to have both bending flexibility in the strip in order to facilitate assembly, and to achieve good fixing after fitting. Lastly, the sealing strip is robust, economical and easy to fit onto a door panel.

DESCRIPTION OF THE FIGURES

Further features and advantages of the present invention will be better understood with the aid of the description and drawings, in which.

DETAILED DESCRIPTION

Figure 1:
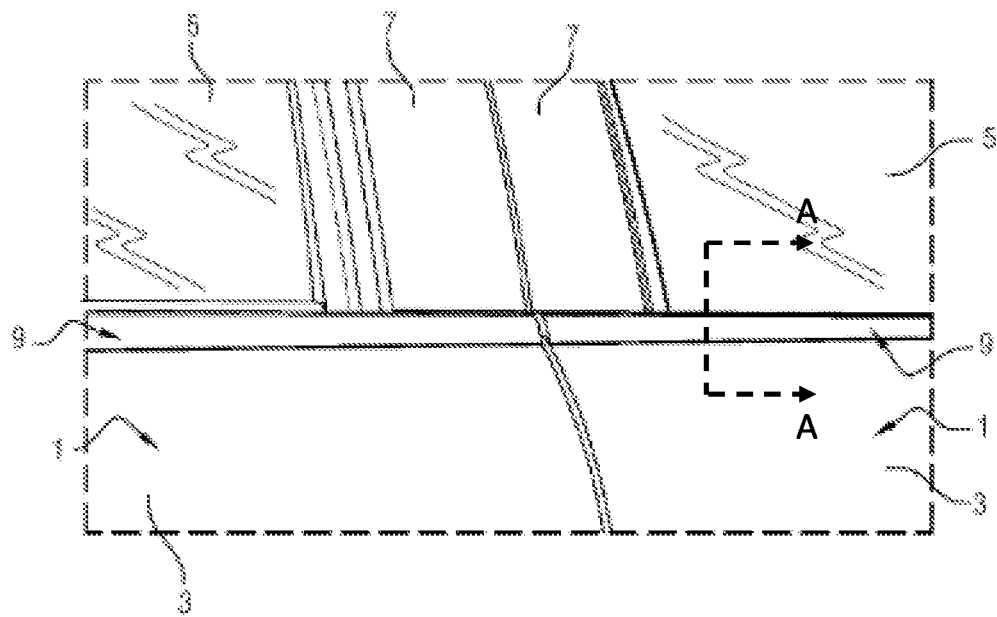
FIG. 1 is a side view of a motor vehicle with two sealing strips.

FIG. 1 is a side view of a motor vehicle with sealing strips. The vehicle comprises two doors 1, front and back. Each door 1 comprises an exterior panel 3, a window 5 that can slide along the panel 3, and a trim 7. This exterior panel 3 comprises an upper edge onto which is fitted the sealing strip 9, commonly called the window seal.

Figure 2:
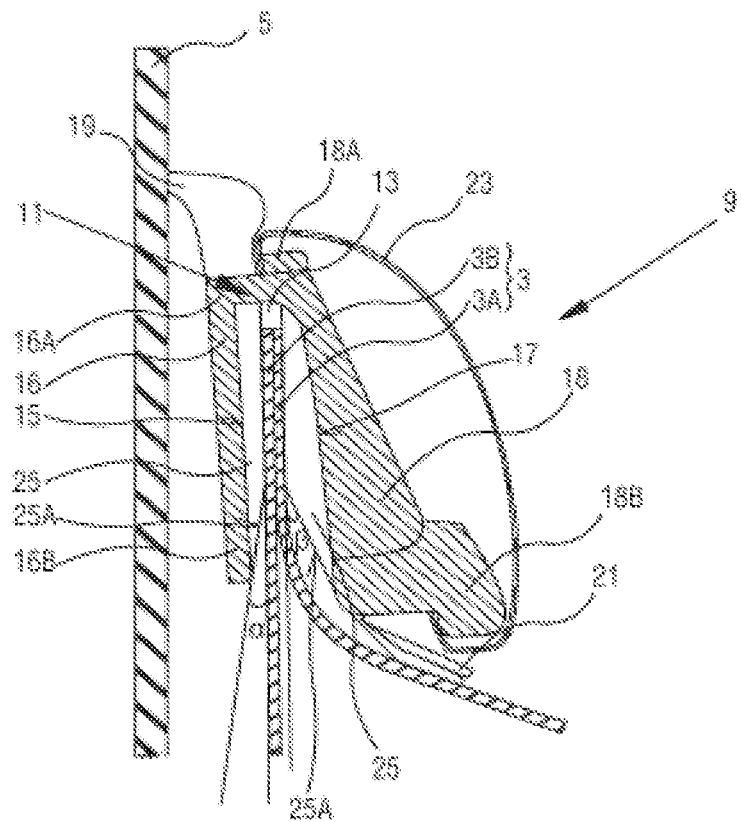
FIG. 2 is a cross-sectional view of the sealing strip taken along line A-A of FIGS. 1 and 4 showing the clamping ridges.

FIG. 2 is a sectional view of the sealing strip, the strip being fitted on the upper edge of the outer panel of the door. A stiffener 3B can be arranged on the rear face of the upper edge 3A of the exterior panel 3, serving to stiffen it. In this case, the upper edge 3A, complete with the stiffener 3B, is fitted with the sealing strip 9. This strip 9 comprises a body 11 forming a slot 13, the slot comprising two opposing faces, i.e., an interior face 15 located on the side of the lip 19 resting against the window 5 and an exterior face 17 opposite the interior face 15. The interior face 15 is formed on a wall 16 of the body 11, the wall 16 comprising an upper end 16A, above which is located the lip 19, and a lower end 16B.

The exterior face 17 of the slot 13 is formed on a wall 18 of the body 11, the wall 18 comprising an upper end 18A and a lower end 18B. From the lower end 18B extend two lower lips 21 that rest against the exterior panel 3 of the door, and an exterior molding 23. This molding 23 completely and longitudinally covers the strip 9 and serves to improve the appearance of the strip 9. The upper end of this molding 23 ends in a hook positioned between the lip 19 and the upper end 18A of the wall 18 forming the exterior face 17.

The interior and exterior faces (15, 17) also comprise ridges 25 positioned transversely to the longitudinal axis of the strip 9. The ridges 25 can be fluted. Each ridge 25 has an exterior end face 25A making a mean angle α or β of between 10° and 30° in relation to the longitudinal direction of the slot 13, the exterior end face 25A, due to its inclination, facilitating assembly while limiting the risk of the ridge 25 of the strip 9 being pulled off. These ridges 25 advantageously have a semi-circular cross-section and are distributed evenly along the strip 9.

Figure 3:
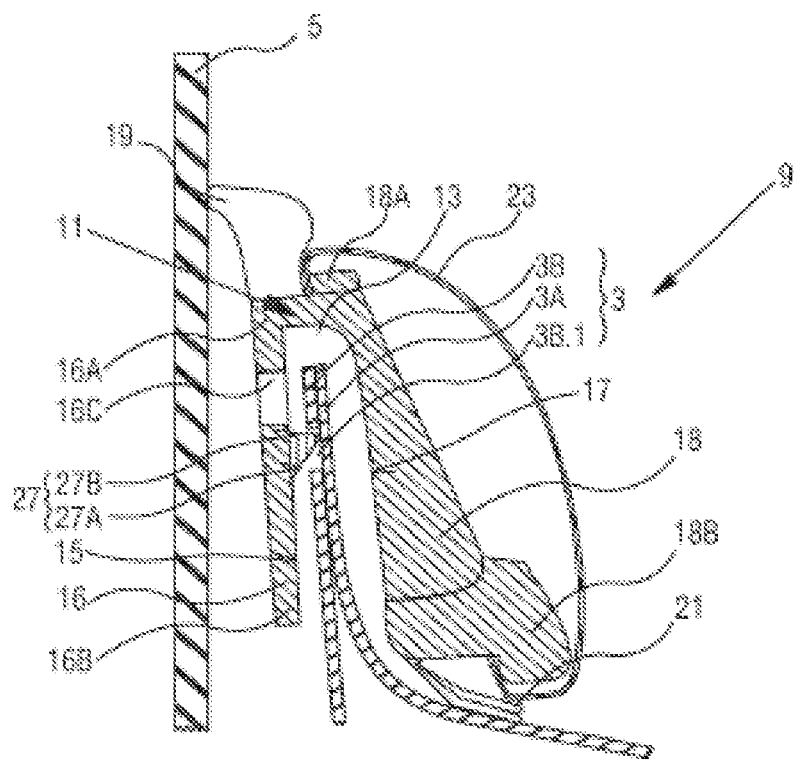
FIG. 3 is a section of the sealing strip taken along line B-B of FIG. 4 showing a boss.

FIG. 3 is another cross-sectional view of the strip showing a boss. The boss 27 is positioned on the interior face 15 in the longitudinal direction of the strip 9. This boss 27 has a triangular section with one inclined sliding face 27A along the upper edge 3A and one retaining face 27B in relation to an orifice 3B.1 in the stiffener 3B. This boss 27 improves the hold of the strip 9 on the panel 3. Above the boss 27 and in the wall 16 of the interior face 15 there is an opening 16C serving to improve the flexibility of the wall 16. Thus, the boss 27 is adjacent to the lower margin of the opening 16C.

Figure 4:
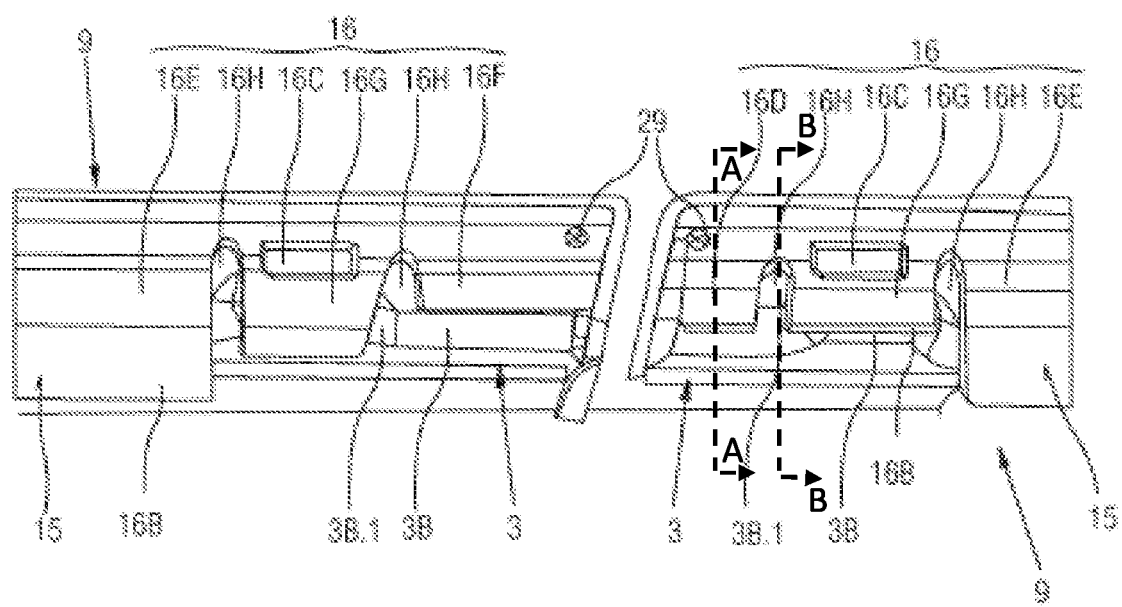
FIG. 4 is a rear view of two sealing strips fitted onto two upper edges of exterior door panels, such as in FIG. 1.

FIG. 4 shows a rear view of two strips fitted on the exterior panels of the doors in FIG. 1. In this view, parts of the strips 9 of the front and rear doors can be seen. The wall 16 forming the interior face 15 is then subdivided into front 16D, central 16E and rear 16F portions, the portions of the strips (16D, 16E, 16F) being separated by clips 16G. The portions of the strips (16D, 16E, 16F) and the clips 16G are formed by cutouts 16H in the strips, the cutouts 16H extending from an exterior edge of the wall 16 of the interior face 15 of the slot to a distance from the bottom of the slot of between 0 mm and 10 mm, more preferably between 0 mm and 5 mm. Increasing the depth of the cutouts 16H also facilitates, by improving the flexibility of the strip 9, its mounting onto the exterior panel 3 of the door. Each clip 16G also comprises the opening 16C, as described in FIG. 3. This opening 16C has a longitudinal axis preferably aligned with the bottoms of the cutouts 16H. The clips 16G are preferably adjacent to the lateral ends of the strip 9, and more preferably positioned in the first quarter from the lateral ends of the strip 9. The clips 16G have a reduced height of the wall 16 that can be less than 80% and/or more than 50% of the maximum height of the wall 16. The strip 9 also comprises fixing elements 29, which can in particular be screws, positioned at the lateral ends of the strip 9.

Figure 5:
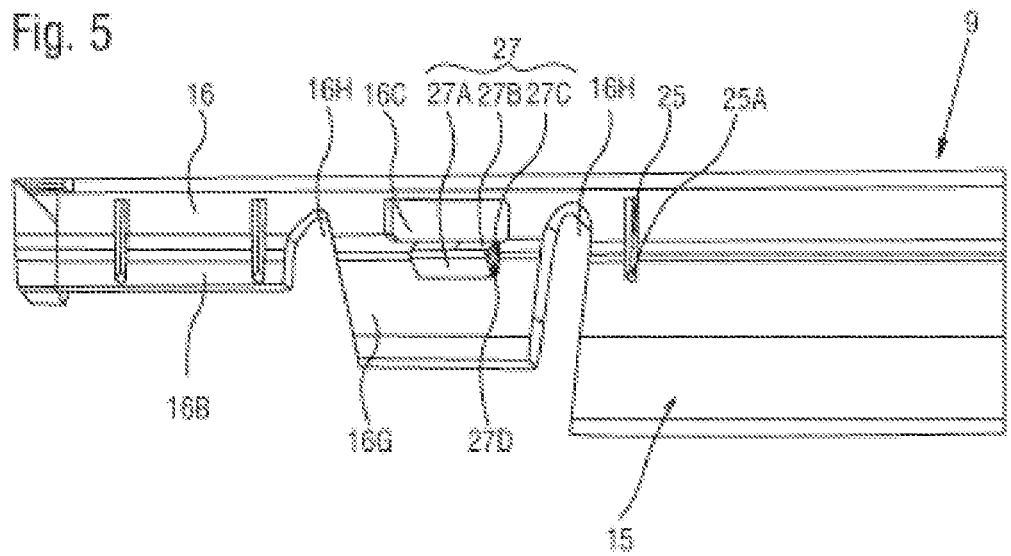
FIG. 5 is a view of the interior face of the slot of the sealing strip.

FIG. 5 is a longitudinal cross-sectional view of the strip, showing the interior face of the strip's slot. The boss 27 is located on the clip 16G and below the opening 16C. The boss 27 also comprises two end faces 27C that form edges 27D with the inclined sliding face 27A, at least one of the edges 27D forming a chamfer of at least 2 mm×2 mm. The ridges 25 are more preferably located on the wall 16 forming the interior face 15, in the central, front and rear portions and/or on the exterior face of the slot. Preferably, these ridges 25 are at least two in number, positioned in the front or rear portion respectively and in the central portion, and more preferably positioned longitudinally at less than 10 cm from the cutout 16H separating the respective portion of the clip 16G.

Figure 6:
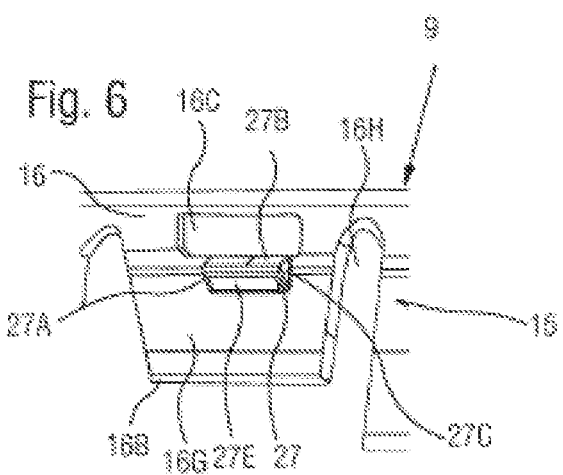
FIG. 6 is a view of the interior face of the slot of the strip showing the integration of a metal insert on the boss.

FIG. 6 is a view of the interior face of the strip with the boss comprising a metal piece according to a first variation of the strip. The metal piece (27E, 27F) is, in this variation, a metal insert 27E incorporated when molding the strip 9. It is on the inclined sliding face 27A of the boss 27. This insert 27E serves to reduce the grip of the boss 27 on the exterior panel of the door, and more particularly the grip of the inclined sliding face 27A on the upper edge of the panel.

Figure 7A:
FIG. 7A is a cross-section of a metal clip which is fixed to the boss.
Figure 7B:
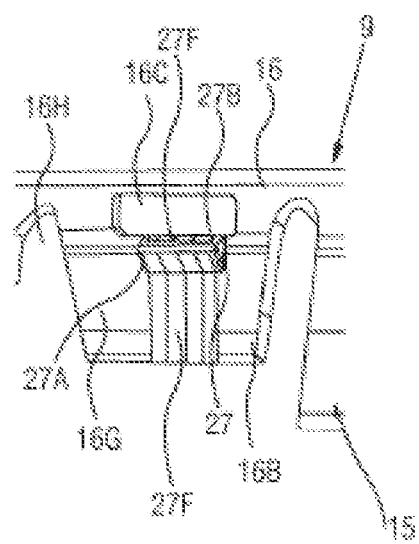
FIG. 7B is a view of the interior face of the sealing strip, showing the fixing of the clip of FIG. 7A onto the boss.

FIGS. 7A and 7B show a second variation of the strip where the inclined sliding face of the boss is created by a fastener. A cross-section of the fastener is shown in FIG. 7A and its mounting onto the boss is shown in FIG. 7B. Fastener 27F is preferably thin and is fixed onto the strip 9 from the lower end 16B of the wall 16 of the clip 16G. The fastener 27F extends along the interior face 15 up to the inclined sliding face 27A. It extends to the back of the wall 16 of the interior face 15 up to the retaining face 27B of the boss 27.

The mounting of the strip 9 can comprise a first phase of orientation at around 30° of the strip 9 in relation to the upper edge 3A of the exterior panel 3. A closing surface of the slot 13 (not shown in the Figures), located at one end of the strip 9, is positioned abutting against a respective end stop of the exterior panel 3 of the door 1. The strip 9 is then unrolled along the upper edge 3A of the panel 3.

Preferably, the strip is made of thermoplastic materials, the exterior molding 23 possibly made of different materials to the strip itself, such as chrome. The strip is preferably made by molding, but can be produced by other techniques known to a person skilled in the art. The stiffener can be made by stamping, the orifices then preferably being cut out before fixing the stiffener to the back of the upper edge of the exterior panel of the door.

The invention claimed is:

1. A sealing strip adapted to be mounted on an upper edge of an exterior panel of a door of a vehicle having a window, said strip comprising:
    a body forming a slot having two opposing faces, said slot being sized to fit over the upper edge of the exterior panel of the vehicle;
    a lip extending along the body, intended to contact the window;
    wherein at least one of the two opposing faces of the slot comprises ridges running transversely to the strip, each ridge having an end face external to the slot, having a profile that makes a mean angle of between 10° and 30° with a main direction of said slot so as to facilitate insertion of the edge in the slot;
    wherein one of the two opposing faces of the slot is an internal face located on a side of the lip, said face also comprising at least one boss having a triangular section extending longitudinally so as to form an inclined sliding face along the upper edge, the boss forming a clip adapted to engage in a corresponding orifice in the upper edge of the exterior panel; and
    wherein the at least one boss also comprises a face engaging in the corresponding orifice of the upper edge of the exterior panel, and two end faces, the inclined sliding face forming with said end faces two edges, at least one of said edges having a chamfer of at least 2 mm×2 mm.

2. The sealing strip according to claim 1, wherein the ridges each have a semi-circular cross section and are distributed evenly along the strip.

3. The sealing strip according to claim 1, wherein the at least one boss comprises, on the inclined sliding face, a metal piece adapted to reduce the grip of the boss on the upper edge of the panel when fitting the strip onto the upper edge of the panel.

4. A motor vehicle comprising the sealing strip of claim 1 mounted on the upper edge of the exterior panel of said vehicle.

5. A sealing strip adapted to be mounted on an upper edge of an exterior panel of a door of a vehicle having a window, said strip comprising:
    a body forming a slot having two opposing faces, said slot being sized to fit over the upper edge of the exterior panel of the vehicle;
    a lip extending along the body, intended to contact the window;
    wherein at least one of the two opposing faces of the slot comprises ridges running transversely to the strip, each ridge having an end face external to the slot, having a profile that makes a mean angle of between 10° and 30° with a main direction of said slot so as to facilitate insertion of the edge in the slot;
    wherein one of the two opposing faces of the slot is an internal face located on a side of the lip, said face also comprising at least one boss having a triangular section extending longitudinally so as to form an inclined sliding face along the upper edge, the boss forming a clip adapted to engage in a corresponding orifice in the upper edge of the exterior panel; and
    wherein the portion of the body forming the interior face of the slot is a wall with transverse cutouts on either side of the at least one boss so as to enable said wall to bend at said face between said cutouts when fitting the strip onto the upper edge.

6. The sealing strip according to claim 5, wherein the cutouts extend from an exterior edge of the interior face towards a bottom of the slot to a distance from said bottom of between 0 mm and 10 mm.

7. The sealing strip according to claim 5, wherein the wall forming the interior face of the slot has at least one opening between two cutouts on either side of the at least one boss.

8. The sealing strip according to claim 7, wherein the opening or openings extend longitudinally in alignment with bottoms of the cutouts.

9. The sealing strip according to claim 5, wherein the ridges each have a semi-circular cross section and are distributed evenly along the strip.

10. The sealing strip according to claim 5, wherein the at least one boss comprises, on the inclined sliding face, a metal piece adapted to reduce the grip of the boss on the upper edge of the panel when fitting the strip onto the upper edge of the panel.

11. A motor vehicle comprising the sealing strip of claim 5 mounted on the upper edge of the exterior panel.

* * * * *